United States Patent
Baek et al.

(10) Patent No.: US 12,526,277 B2
(45) Date of Patent: Jan. 13, 2026

(54) METHOD FOR MANAGING USER WHO USES FINGERPRINT AUTHENTICATION AND FINGERPRINT AUTHENTICATION SYSTEM THEREFOR

(71) Applicant: UNIONCOMMUNITY CO., LTD., Seoul (KR)

(72) Inventors: Young Hyun Baek, Seoul (KR); Yo Shik Shin, Seoul (KR)

(73) Assignee: UNIONCOMMUNITY CO., LTD., Seoul (KR)

( * ) Notice: Subject to any disclaimer, the term of this patent is extended or adjusted under 35 U.S.C. 154(b) by 297 days.

(21) Appl. No.: 18/479,650

(22) Filed: Oct. 2, 2023

(65) Prior Publication Data
US 2024/0163285 A1 May 16, 2024

(30) Foreign Application Priority Data
Nov. 10, 2022 (KR) .................. 10-2022-0149422

(51) Int. Cl.
H04L 9/40 (2022.01)
(52) U.S. Cl.
CPC .................. *H04L 63/0861* (2013.01)
(58) Field of Classification Search
None
See application file for complete search history.

(56) References Cited

U.S. PATENT DOCUMENTS

| 10,216,975 B1 * | 2/2019 | He .................... H10K 59/879 |
| 10,706,257 B2 * | 7/2020 | Beaudet ............ G06V 40/1365 |
| 2016/0316369 A1 * | 10/2016 | Jiang .................... H04W 12/08 |

FOREIGN PATENT DOCUMENTS

| CN | 104751019 | * | 2/2015 |
| KR | 20080095333 A | | 10/2008 |
| KR | 201061576 A | | 3/2010 |
| KR | 20110069998 A | | 6/2011 |
| KR | 101179559 B1 | | 9/2012 |
| KR | 20160017941 A | | 2/2016 |
| KR | 20170002892 A | | 1/2017 |
| KR | 20170112302 A | | 10/2017 |
| KR | 20170116530 A | | 10/2017 |
| KR | 20170119245 A | | 10/2017 |

OTHER PUBLICATIONS

Baek et al., "The Fake Fingerprint Detection System Using A Novel Color Distribution", IEEE 978-1-5090-1325-8, 2016. (Year: 2016).*
Chang et al., "Fingerprint Spoof Detection By NIR Optical Analysis", Jul. 2011, DOI: 10.5772/19453. (Year: 2011).*

* cited by examiner

*Primary Examiner* — Piotr Poltorak
(74) *Attorney, Agent, or Firm* — STIP Law Group, LLC

(57) ABSTRACT

Disclosed are method for managing user who uses fingerprint authentication and fingerprint authentication system therefor. The fingerprint authentication system of the present invention may perform reuse registration of access authentication that allows again or re-registers access authentication for a pre-registered user. In a case of reuse registration, when the user enters a fingerprint, the system can prevent the other person to re-register as the registered user by determining whether the fingerprint is a fake and comparing the fingerprint image for authentication with the registered fingerprint image.

8 Claims, 3 Drawing Sheets

METHOD FOR MANAGING USER WHO USES FINGERPRINT AUTHENTICATION AND FINGERPRINT AUTHENTICATION SYSTEM THEREFOR

GOVERNMENT SUPPORT STATEMENT

This work was supported by the Nuclear Safety Research Program through the Korea Foundation of Nuclear Safety (KoFONS) using the financial resources granted by the Nuclear Safety and Security Commission (NSSC) of the Republic of Korea. (RS-2021-KN060710)

CROSS-REFERENCE TO RELATED APPLICATIONS

This application claims priority from Korean Patent Application No. 10-2022-0149422, filed on Nov. 10, 2022, in the Korean Intellectual Property Office, the disclosure of which is incorporated herein by reference in its entirety.

BACKGROUND OF THE INVENTION

Field of the Invention

This invention is about the user management method of the fingerprint authentication system, which identifies the user by comparing the pre-registered fingerprint image and a newly generated fingerprint image for authentication as well as comparing fingerprint data (or a fingerprint template) when re-activating or re-registering a user's fingerprint.

Description of the Related Art

Biometrics using a user's fingerprint, face, iris, vein, voice, etc. is widely used as a means of user authentication because of its uniqueness, difficulty in cloning, and no risk of loss.

Fingerprint authentication is a process of finding fingerprint that matches or is similar to a certain level by comparing newly extracted fingerprint data for authentication with multiple fingerprint data registered in advance. Authentication is successful if there is an identical or similar fingerprint data among the registered fingerprint data, and authentication is failure if there is no matching or similar fingerprint data above a certain level. The fingerprint data is characteristic data extracted from the user's fingerprint image and is not a fingerprint image itself. This is because comparing fingerprint images as they are is very inefficient and may be impossible due to high computational volume and high complexity of the computation if system resources are small.

Generally, personal authentication is mainly used in areas where security is important, such as access control, e-commerce, financial transactions, security of personal computers (PCs), and automated document approval processes.

Fake fingerprints are typically artificial fingerprints made of transparent film or paper on which fingerprint images are printed or fingerprint models made by solidifying materials such as silicon, rubber, gelatin, and bonds for woodworking in a fingerprint-shaped mold. Fake fingerprints are attached to actual human fingerprints or on other fixtures to use.

If such a fake fingerprint is used at a conventional fingerprint recognition device, the device obtains a fingerprint image similar to a biological fingerprint and extracts characteristic points (or feature points) from the fingerprint image without considering whether the fingerprint is a biological fingerprint or not. In the prior art, there have been many attempts to develop methods of detecting fake fingerprints. For example, there was a method using an additional sensor that is placed on the side of a fingerprint-contacting surface and recognizes the living body.

In addition, on the Korean Patent No. 10-1179559, the applicant proposed a method for generating an additional fingerprint image to detect fake fingerprints by further disposing of an additional light source emitting light toward the prism at an incident angle within a predetermined range. This method uses the fact that the critical angle for total reflection is changed when the fake fingerprint contacts the fingerprint-contacting surface of the prism.

The fingerprint authentication system is a device that registers a user's fingerprint image and authenticates the user through fingerprint authentication. For example, one of the methods for user management is that some groups are allowed to enter into only for a certain period of the summer. Therefore, after passing the period, access authentication for the group is deactivated and the group cannot enter in, but when the next summer comes, access authentication for the group is activated again for a certain period according to the access control procedure. In the process of activating access authentication again, another person may attempt to activate the re-use by disguising oneself as a pre-registered user or another person may register the re-use with a fake fingerprint copying the pre-registered user. In this case, there is no way to filter out them at the conventional fingerprint authentication system.

RELATED ART DOCUMENTS

[Patent Documents] (Patent Document 1) Korean Patent No. 10-1179559 (Title: Fingerprint Recognition Apparatus and Method for Detecting Fake Fingerprints)

[Patent Documents] (Patent Document 2) Korean Patent Publication No. 10-2017-0112302 (Title: Fake Fingerprint Detecting Apparatus and Method by Using Neural Network Learning)

Technical Problem

The present invention is directed at providing a fingerprint authentication system and its user management method that can determine whether the fingerprint contacting is a fake fingerprint, and that can prevent fake registration that the other person registers as the pre-registered user by comparing the registered fingerprint image with the newly generated fingerprint image for reuse.

Technical Solution

One aspect of the present invention provides user management method of the fingerprint authentication system, the method comprises the steps below. A terminal receives a reuse request for access authentication for a registered user whose access authentication is suspended and receiving a User Identification Information for the reuse request. The terminal performs primary filtering. The primary filtering is that the terminal acquires a fingerprint image for authentication from a user's fingerprint through a fingerprint sensor and determines whether the fingerprint is a fake or biological fingerprint based on at least one of the color change, blood flow change, ridge crushing, the size change of sweat glands, and electrical conductivity of the fingerprint. The terminal provides the fingerprint image for authentication generated in the primary filtering to a registration server along with the User Identification Information. The registration server performs secondary filtering. The secondary filtering is that the registration server measures similarity by comparing the fingerprint image for authentication with the registered fingerprint image that has been registered as the User Identification Information. And, the registration server provides a message to allow the re-use of access authentication for the user to the terminal when the fingerprint is judged as a biological fingerprint in the primary filtering and the similarity is measured to more than a threshold value in the secondary filtering.

In an embodiment, the user management method may further comprise; determining, by the registration server, that the fingerprint for which the user requests the reuse is a fake fingerprint or the fingerprint is not the user's fingerprint mapped to the User Identification Information in a case that the primary filtering unit judges the fingerprint as a fake fingerprint or the similarity is measured to less than the threshold value, and providing a warning message to the terminal.

In another embodiment, it is recommended that the fingerprint image for authentication and the registered fingerprint image are RAW image files generated by the fingerprint sensor.

In another embodiment, the similarity measurement of the secondary filtering is to perform a similarity measurement of the pattern between the fingerprint image for authentication and the registered fingerprint image and at least one selected from the comparison of the average thickness of the ridge and valley of the fingerprints, the comparison of the number of pixels sorted by color, and the distribution of pixel gradation values.

Fingerprint Authentication System

Other embodiments of the present invention provide a fingerprint authentication system comprising a terminal that receives a request for reuse of access authentication for a registered user whose access authentication is suspended and a User Identification Information for the reuse request and a registration server performing the request for reuse with the terminal.

The terminal comprises a fingerprint sensor that receives a fingerprint from the user and acquires a fingerprint image for authentication; and a primary filtering unit that determines whether the fingerprint is a fake or biological fingerprint based on at least one of the color change, blood flow change, ridge crushing, the size change of sweat glands, and electrical conductivity of the fingerprint and providing the fingerprint image for authentication along with the User Identification Information to the registration server.

The registration server comprises, a user management unit that stores and manages fingerprint images registered in the database for the registered users; and a secondary filtering unit that measures similarity by comparing the fingerprint image for authentication with the registered fingerprint image stored in the database as the User Identification Information and provides a message to allow the re-use of access authentication for the user to the terminal when the primary filtering unit judges that the fingerprint is a biological fingerprint and the similarity is bigger than a threshold value.

Advantageous Effects

The fingerprint authentication system of this invention can prevent others from registering reuse by disguising themselves as registered users in managing the reuse of access authentication for users who are pre-registered users but do not currently use access authentication.

At this time, the fingerprint authentication system of this invention can prevent the use of imitation fingerprints, the use of imitation fingerprints, the use of fake fingerprints, the use of fake fingerprints by others, or the use of fake fingerprints by others.

MODES OF THE INVENTION

Figure 1:
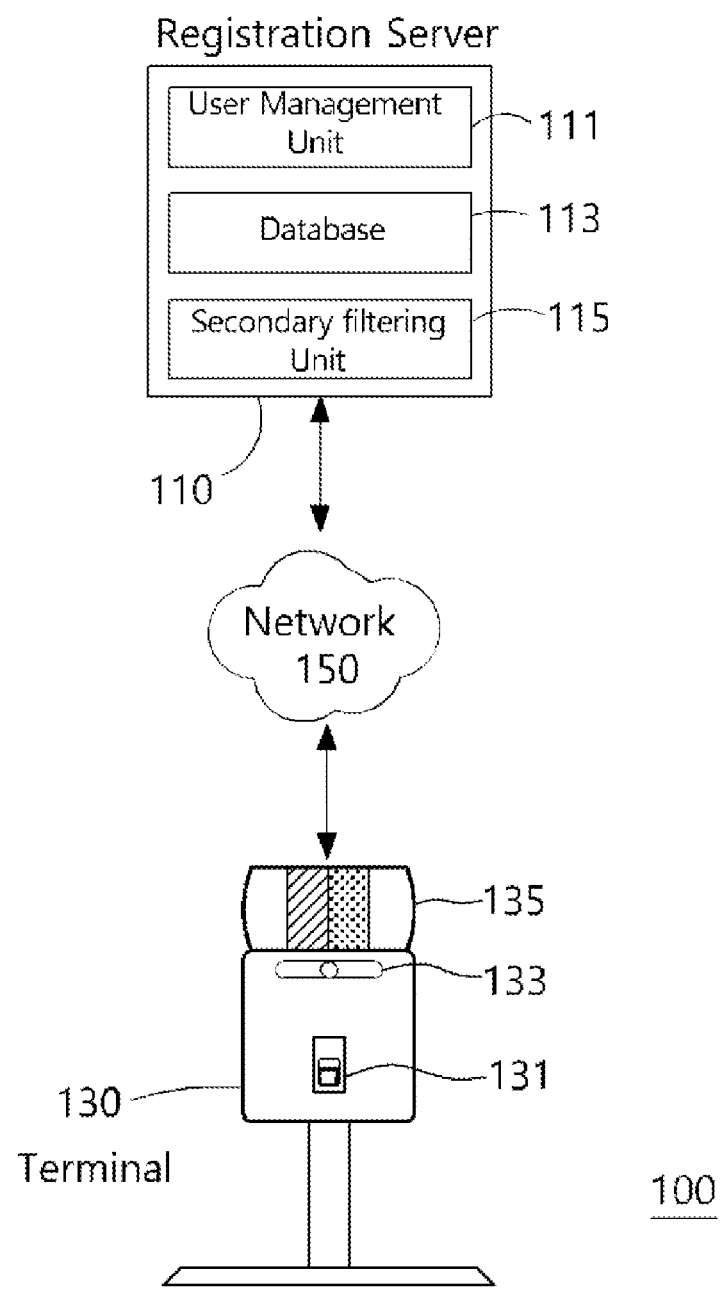
FIG. 1 is a block diagram of a fingerprint authentication system according to an embodiment of the present invention.

Certain exemplary embodiments of the present invention will now be described in greater detail with reference to the accompanying drawings. In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Referring to FIG. 1, the fingerprint authentication system 100 of the present invention performs user registration and user authentication using user fingerprints, including a registration server 110 and a terminal 130, which are interconnected through a network 150.

Figure 2:
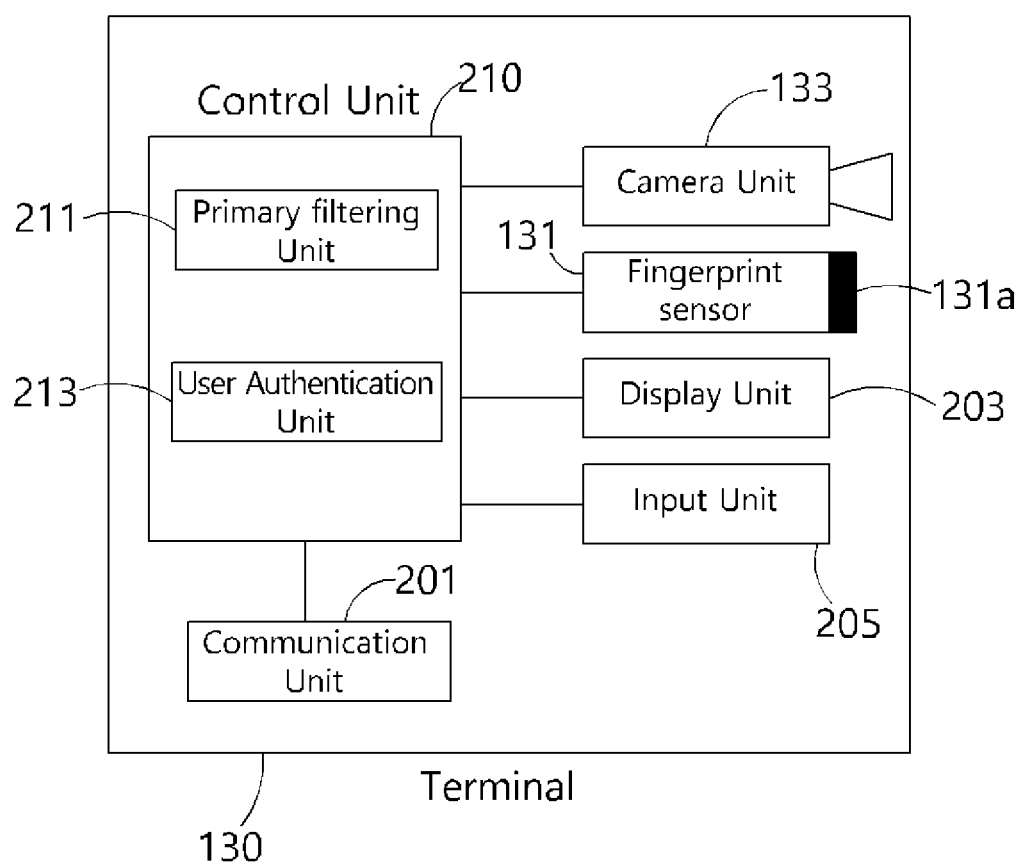
FIG. 2 is a block diagram of a terminal according to an embodiment of the present invention.

The registration server 110 manages user registration and the reuse of access authentication by biometric authentication (fingerprint authentication, face authentication, etc.), including user management unit 111, database 113, and secondary filtering unit 115. Here, the term 'reuse of access authentication' or 'access authentication reuse' refers to allowing access authentication again for users who have already registered and who are currently unable to enter due to the deactivation of access authentication. Since the access authentication is currently suspended, the reuse of access authentication must be registered so that access authentication reopens. The reuse of access authentication of the present invention prevents others from reusing by disguising themselves as registered users through primary filtering performed on the terminal 130 and secondary filtering performed on the registration server 110. In the following, the present invention will be described focused on mainly fingerprint authentication, but other biometric authentication (face authentication, iris authentication, etc.) can be used as an auxiliary authentication method along with fingerprint authentication. For example, the terminal 130 of FIGS. 1 and 2 is an example in which fingerprint authentication and face authentication are used.

The user management unit 111 stores and manages a User Registration Information of the registered user in the database 113, and manages not only the registration procedure but also the reuse of access authentication. The User Registration Information is the one that the terminal 130 obtains and provides to the registration server 110 during the registration process. The User Registration Information of this invention includes User Identification Information, fingerprint image for registration, and fingerprint data for registration. The user management unit 111 can register multiple users, so the database 113 stores multiple fingerprint images for registration and fingerprint data for registration for multiple registered users, which are distinguished and managed by User Identification Codes or User Identification Information.

The User Identification Code is a code given by the user management unit 111 or the terminal 130 according to a certain algorithm to identify the user, and includes not only a serial number, a string, or a combination thereof, but also a two-dimensional barcode containing the serial number, string, or combination information.

The User Identification Information (ID) is information that the user inputs to the terminal 130 to identify himself/herself, and biometric information such as fingerprints is not applicable. For example, anything that the user can enter, such as a user name, resident number, employee number, and driver's license number, can be used as the User Identification Information.

The fingerprint image is an image in the RAW image format obtained primarily from the user's fingerprint by the fingerprint sensor 131, and is preferably a color image. Raw Image Format is one of the image file formats and refers to an image that has been rarely processed or processed to a minimum after being produced by an image sensor (not shown) in the fingerprint sensor 131. The fingerprint image extracted and registered for registration (hereinafter referred to as the fingerprint image for registration) and the fingerprint image for authentication described below are fingerprint images in the RAW image format of this invention.

The fingerprint sensor 131 can output multiple fingerprint images while receiving fingerprints, and any of them may be used, but it is usually recommended to perform basic quality tests in order to select the one with the highest quality or higher than a certain quality.

Fingerprint data is characteristic data having the characteristics of the corresponding fingerprint, acquired from a fingerprint image, and is used to determine the identity (or similarity) of the two fingerprints. The fingerprint data is also called a fingerprint template. The method of obtaining fingerprint data from a fingerprint image uses an image processing algorithm known in the field of fingerprint recognition. In the present invention, the fingerprint data includes fingerprint data for registration and fingerprint data for authentication.

In response to the request for the reuse of access authentication, the user management unit 111 determines whether the user who requested reuse is using fake fingerprints or disguised as a registered user by using the result of primary filtering of terminal 130 and the result of secondary filtering of secondary filtering unit 115. In this invention, if it is judged to be a biological fingerprint in the primary filtering of the terminal 130 and the secondary filling of secondary filtering unit 115 reveals a similarity above the reference value, the user management unit 111 registers the user's reuse of the access authentication.

In case it is determined that it is a fake fingerprint in the primary filtering of the terminal 130 or similarity is calculated as less than the reference value in the secondary filtering, the user management unit 111 provides a warning message to the terminal 130 because the fingerprint for reuse request is a fake one or is not for the registered users.

The secondary filtering unit 115 receives a fingerprint image for authentication from terminal 130 which is obtained from the user who requested the reuse of access authentication, and judges whether the similarity is higher than the reference value by comparing the fingerprint image for authentication with the fingerprint image registered in the name of the user's User Identification Information in order to determine whether the requester is the same as the register user or the fingerprint is a fake one.

At this point, to judge the similarity, the secondary filtering unit 115 calculates the similarity between the fingerprint image for authentication and the registered fingerprint image. And, at least one selected from the average thickness of the ridge and valley of the fingerprint, the distribution of the number of pixels by color, and the distribution of pixel values can be performed together with the pattern similarity of the two fingerprint images to calculate the similarity. The distribution of the number of pixels by color is to compare the number of pixels in each color by dividing the pixels, extracted from the fingerprint area of the fingerprint image for authentication and the registered fingerprint image, by R, G, and B colors. The distribution of pixel values determines the similarity in the shape of two graphs in which the pixel values of all pixels in the fingerprint area of the two fingerprint images are placed. Since the fingerprint images are obtained from the same user, the average of the entire image may vary depending on the brightness of the measurement space, but the graph must appear in a similar shape.

If the two fingerprint images are obtained from different fingerprints, the pattern's similarity is basically different, but the average thickness of the ridge and valley, the distribution of the number of pixels by color, and the distribution of pixel values can all be different. In particular, if user B who makes the reuse request disguises as user A by using user A's imitation fingerprint, even if the pattern may be similar, the imitation can be detected because the distribution of pixel values or the distribution of pixel numbers by color is different.

Referring to FIG. 2, the terminal 130 performs user registration, the reuse of access authentication, and user authentication by fingerprints, including a communication unit 201, a fingerprint sensor 131, a display unit 203, an input unit 205, a camera unit 133, a primary filtering unit 211, and a user authentication unit 213. Depending on the embodiment, as in FIG. 2, the terminal 130 is a model that can handle face authentication as an additional authentication method by using the camera unit 133, but face authentication using the camera unit 133 and the user authentication unit 213 is not an essential element of the present invention.

The communication unit 201 is a means of accessing the registration server 110 through the network 150, and various previously known communication methods such as mobile communication networks, wired LANs, and wireless LANs are possible.

The fingerprint sensor 131 generates a color fingerprint image in RAW image format from a fingerprint in contact with the fingerprint-contacting surface 131*a* and provides the color fingerprint image to the primary filtering unit 211. The fingerprint sensor 131 uses a sensor that generates a fingerprint image in an optical manner using a light refractor (prism) and an image sensor (not shown). The semiconductor type does not generate a fingerprint image of the RAW image format. The fingerprint sensor 131 may generate multiple fingerprint images according to a preset algorithm while the user contacts a fingerprint and provide the fingerprint images to the primary filtering unit 211 and/or the user authentication unit 213.

The display unit 203 visually displays various information to the user, and the input unit 205 receives User Identification Information and various control commands. In the terminal 130 of FIG. 1, the warning lamp 135, an example of the display unit 203, may turn on the different color lights according to the situation. The display unit 203 and the input unit 205 may be integrated in the form of a touch screen.

The camera unit 133 photographs the user's face, generates a face image for face authentication, and provides the face image to the user authentication unit 213. The camera unit 133 may generate a color image and/or an infrared image.

The primary filtering unit 211 operates in the Reuse-registration mode and determines whether the fingerprint entered into the fingerprint sensor 131 is a fake fingerprint or a biological fingerprint using a series of fingerprint images continuously generated by the fingerprint sensor 131.

If it is confirmed that the fingerprint in contact with the fingerprint sensor 131 is not a fake fingerprint at the primary filtering, the primary filtering unit 211 provides the fingerprint image for authentication to the registration server 110 along with the User Identification Information of the requester, the user who requested access authentication reuse, in order to request the access authentication reuse.

As a method using the fingerprint image for authentication for determining whether it is a fake fingerprint, detecting at least one of the fingerprint color changes, blood flow changes, ridge crushing, sweat gland size changes, and electrical conductivity, and comparing with a predetermined reference value can be used.

The applicant proposed a method of determining a fake fingerprint by calculating the size or average gray level of fingerprint area in the fingerprint image after irradiating light for determining a biological fingerprint with a predetermined angle of incidence in the fingerprint-contacting surface 131a (Patent Publication No. 10-2011-0069998, Patent Publication No. 10-2008-0095333). In this case, the fingerprint sensor 131 must include a light source (not shown) that outputs light having a predetermined angle of incidence.

Additionally, Patent Publication No. 10-2017-0119245 (Title of Invention: Device and Method capable of detecting fake fingerprint based on brightness change of fingerprint image according to the heartbeat of the living body) calculates the difference in brightness between pixels with the same coordinate of two fingerprint images acquired when entering a fingerprint.

Additionally, Korean patent publication No. 10-2017-0112302 (Title of Invention: Method and device for detecting fake fingerprints by using neural network learning) of the applicant discloses a method for determining biological fingerprints based on R (red) G (green) B (blue) distribution changing rate and thickness of the ridges.

Korean patent publication No. 10-2017-0116530 (Invention Name: Fake Fingerprint Identification Device and Method) of the applicant discloses a method for determining fake fingerprints by using the feature of light wavelength, the method which can detect fake fingerprints using the fact that the image produced by reflecting the shortest wavelength among visible rays, a violet light, from the biological fingerprint is different with that from the fake fingerprint. In this case, the fingerprint sensor 131 must include a light source (not shown) for outputting light of a necessary wavelength.

In addition, measuring the electrical conductivity of the fingerprint in contact with the fingerprint-contacting surface 131a can be used to detect fake fingerprints. In this case, the fingerprint sensor 131 also is equipped with a circuit for measuring the electrical conductivity of the fingerprint in contact with the fingerprint-contacting surface 131a.

If it is confirmed that the fingerprint in contact with the fingerprint sensor 131 is not a fake fingerprint at the primary filtering, the primary filtering unit 211 provides the fingerprint image for authentication to the registration server 110 along with the User Identification Information of the requester, the user who requested access authentication reuse, in order to request the access authentication reuse.

According to an embodiment, the primary filtering unit 211 may determine whether the contacting fingerprint is a fake fingerprint even in the User authentication mode.

The user authentication unit 213 operates in the User authentication mode and performs the user authentication using a fingerprint image obtained by the fingerprint sensor 131 or a face image obtained by the camera unit 133 from the user who requested the user authentication.

The user authentication unit 213 extracts fingerprint data for authentication from one of a series of multiple fingerprint images that the fingerprint sensor 131 continuously generates during the fingerprint input process, and then authenticates the user by comparing the fingerprint data for authentication with registered fingerprint data. The user authentication method of the user authentication unit 213 may use a conventional fingerprint authentication method.

When a user requests authentication, the terminal 130 generates an fingerprint image for authentication using the fingerprint sensor 131 and extracts fingerprint data for authentication from the fingerprint image for authentication. And then the terminal 130 performs 1:n user authentication by comparing the fingerprint data for authentication with a plurality of registered fingerprint data. In case that the user first inputs his/her User Identification Information for user authentication, the terminal 130 performs 1:1 authentication by comparing fingerprint data for authentication with fingerprint data registered in the name of User Identification Information.

Figure 3:
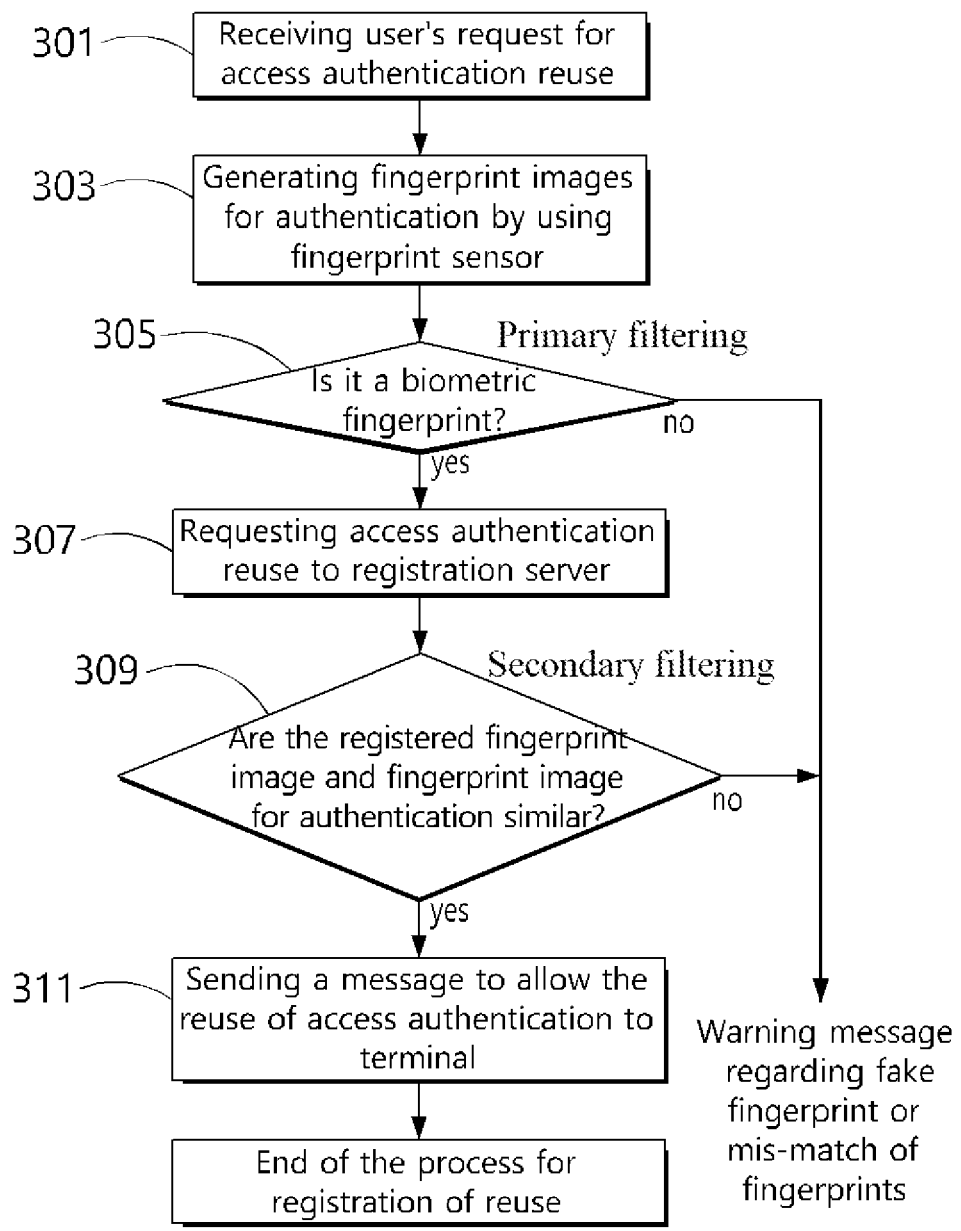
FIG. 3 illustrates a flowchart provided to explain a method for managing users by controlling the re-use of access authentication according to the present invention.

Hereinafter, a user management method by determining the fingerprint authentication reuse of the system 100 according to the present invention will be described with reference to FIG. 3.

<Receiving User's Request for Access Authentication Reuse: S301>

The terminal 130 is a request for access authentication reuse from a user whose access authentication is suspended after user registration. At this time, the terminal 130 may display a picture for receiving guidance and requests for access authentication reuse through the display unit 203, and receive User Identification Information from the user when the user requests the reuse.

<Generating Fingerprint Images for Authentication: S303>

The user contacts his/her fingerprint to the fingerprint-contacting surface 131a of the fingerprint sensor 131. The fingerprint sensor 131 acquires multiple fingerprint images for authentication while the fingerprint contact is maintained and provides them to the primary filtering unit 211. In this case, it is preferable that the fingerprint image is a color image of a raw image format.

<Primary Filtering by Detecting a Fake Fingerprint: S305>

The primary filtering unit 211 determines whether the fingerprint in contact with the fingerprint sensor 131 in step S303 is a fake fingerprint or a biometric fingerprint. To this end, the primary filtering unit 211 can measure at least one of the fingerprint color changes, blood flow changes, ridge crushing, and sweat gland size changes from the multiple fingerprint images for authentication provided by the fingerprint sensor 131, or measure the electrical conductivity of the fingerprint by using a sensor (Not shown) disposed to the fingerprint sensor 131.

<Requesting to the Registration Server to Access Authentication Reuse: S307>

If it is determined that the fingerprint entered from the user is a biological fingerprint in step S305, the primary filtering unit 211 provides a selected one of multiple fingerprint images for authentication to the registration server 110 along with User Identification Information and requests access authentication reuse (S307). If the fingerprint entered by the user is a fake fingerprint, the primary filtering unit 211 may display a warning message with regard to the result of the primary filtering to the user through the display unit 203.

Depending on the embodiment, even if the fingerprint entered by the user in step S305 is judged to be a fake fingerprint, the primary filtering unit 211 may provide one of the multiple fingerprint images for authentication generated by the fingerprint sensor 131 to the registration server 110 as the historical data along with User Identification Information.

<Secondary Filtering by Comparing Fingerprint Images: S309 and S311>

In case that the registration server 110 receives a reuse request together with the fingerprint image for authentication and the User Identification Information, the secondary filtering unit 115 extracts a registered fingerprint image mapped to the User Identification Information from the database 113 and then measures the similarity by comparing the fingerprint image for authentication with the registered fingerprint image. (S309)

When the fingerprint is judged as a biological fingerprint in the primary filtering in step S307 and the similarity is measured to more than a threshold value in the secondary filtering in step S309, the second filtering unit 115 provides a message to the terminal 130 that allows the user to reuse access authentication (S311).

If the similarity is less than the reference value in the second filtering of step S309 or if the fingerprint is judged as a fake fingerprint in the primary filtering in step S307, the second filtering unit 115 determines that the fingerprint entered by the user is a fake fingerprint or different to the registered one in the name of the user and provides a warning message to the terminal 130.

In the above manner, the fingerprint authentication system 100 of the present invention manages the registered user by controlling the access authentication reuse.

Embodiment: User Authentication During Determining Access Authentication Reuse

According to the embodiment, if the fingerprint entered by the user is judged as a biometric fingerprint in step S305, the user authentication unit 213 of terminal 130 extracts fingerprint data from the fingerprint image for authentication and then performs authentication by comparing the fingerprint data for authentication and the registered fingerprint data. The user authentication unit 213 can acquire registered fingerprint data by extracting from a storage medium of terminal 130 or requesting to the database 113.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. User management method of the fingerprint authentication system, the method comprises:
   receiving, by a terminal, a reuse request for access authentication for a registered user whose access authentication is suspended and receiving a User Identification Information for the reuse request;
   primary filtering wherein the terminal acquires a fingerprint image for authentication from a user's fingerprint through a fingerprint sensor and determines whether the fingerprint is a fake or biological fingerprint based on at least one of the color change, blood flow change, ridge crushing, the size change of sweat glands, and electrical conductivity of the fingerprint;
   providing, by the terminal, the fingerprint image for authentication generated in the primary filtering to a registration server along with the User Identification Information;
   secondary filtering wherein the registration server measures similarity by comparing the fingerprint image for authentication with the registered fingerprint image that has been registered as the User Identification Information; and
   providing, by the registration server, a message to allow the re-use of access authentication for the user to the terminal when the fingerprint is judged as a biological fingerprint in the primary filtering and the similarity is measured to more than a threshold value in the secondary filtering.

2. The user management method of claim 1, the method further comprises:
   determining, by the registration server, that the fingerprint for which the user requests the reuse is a fake fingerprint or the fingerprint is not the user's fingerprint mapped to the User Identification Information in a case that the primary filtering unit judges the fingerprint as a fake fingerprint or the similarity is measured to less than the threshold value, and providing a warning message to the terminal.

3. The user management method of claim 1, wherein the fingerprint image for authentication and the registered fingerprint image are RAW image files generated by the fingerprint sensor.

4. The user management method of claim 1, wherein the similarity measurement of the secondary filtering is to perform a similarity measurement of the pattern between the fingerprint image for authentication and the registered fingerprint image and at least one selected from the comparison of the average thickness of the ridge and valley of the fingerprints, the comparison of the number of pixels sorted by color, and the distribution of pixel gradation values.

5. A fingerprint authentication system comprising a terminal that receives a request for reuse of access authentication for a registered user whose access authentication is suspended and a User Identification Information for the reuse request and a registration server performing the request for reuse with the terminal:
   wherein the terminal comprises,
   a fingerprint sensor that receives a fingerprint from the user and acquires a fingerprint image for authentication; and a primary filtering unit that determines whether the fingerprint is a fake or biological fingerprint based on at least one of the color change, blood flow change, ridge crushing, the size change of sweat glands, and electrical conductivity of the fingerprint and providing the fingerprint image for authentication along with the User Identification Information to the registration server;

wherein the registration server comprises, a user management unit that stores and manages fingerprint images registered in the database for the registered users; and a secondary filtering unit that measures similarity by comparing the fingerprint image for authentication with the registered fingerprint image stored in the database as the User Identification Information and provides a message to allow the re-use of access authentication for the user to the terminal when the primary filtering unit judges that the fingerprint is a biological fingerprint and the similarity is bigger than a threshold value.

6. The fingerprint authentication system of claim 5, wherein, in a case that the primary filtering unit judges the fingerprint as a fake fingerprint or the similarity is measured to less than the threshold value, the secondary filtering unit determines that the fingerprint which the user requests the reuse is a fake fingerprint or the fingerprint is not the user's fingerprint mapped to the User Identification Information and provides a warning message to the terminal.

7. The user management method of claim 5, wherein the fingerprint image for authentication and the registered fingerprint image are RAW image files generated by the fingerprint sensor.

8. The user management method of claim 5, wherein the secondary filtering unit measures the similarity by performing a similarity measurement of the pattern between the fingerprint image for authentication and the registered fingerprint image and at least one selected from the comparison of the average thickness of the ridge and valley of the fingerprints, the comparison of the number of pixels sorted by color, and the distribution of pixel gradation values.

* * * * *